US006484933B1

(12) United States Patent
Zimmerman et al.

(10) Patent No.: US 6,484,933 B1
(45) Date of Patent: Nov. 26, 2002

(54) AUTOMATIC BARCODE CREATION FOR DATA TRANSFER AND RETRIEVAL

(75) Inventors: Israel Zimmerman, Ashdod (IL); Roni Hasson, Matan (IL)

(73) Assignee: L.C. Code Ltd., Matan (IL)

( * ) Notice: Subject to any disclaimer, the term of this patent is extended or adjusted under 35 U.S.C. 154(b) by 0 days.

(21) Appl. No.: 09/335,838

(22) Filed: Jun. 18, 1999

(51) Int. Cl.[7] .............................................. G06F 17/00
(52) U.S. Cl. ............. 235/375; 235/462.01; 235/462.02; 235/462.11; 235/462.15
(58) Field of Search ............................ 235/375, 462.01, 235/462.02, 462.11, 462.15

(56) References Cited

U.S. PATENT DOCUMENTS

| | | | | | |
|---|---|---|---|---|---|
| 4,440,248 | A | * | 4/1984 | Teraoka | 235/462 X |
| 5,047,615 | A | * | 9/1991 | Fukumoto et al. | 235/432 |
| 5,239,168 | A | | 8/1993 | Durst, Jr. et al. | 235/432 |
| 5,239,622 | A | * | 8/1993 | Best et al. | 235/462 Z |
| 5,278,947 | A | | 1/1994 | Balga, Jr. et al. | 395/117 |
| 5,304,786 | A | | 4/1994 | Pavlidis et al. | 235/462 |
| 5,313,564 | A | | 5/1994 | Kafri et al. | 395/101 |
| 5,387,783 | A | | 2/1995 | Mihm et al. | 235/375 |
| 5,395,181 | A | | 3/1995 | Dezse et al. | 400/103 |
| 5,801,848 | A | | 9/1998 | Kafri | 358/470 |
| 5,962,829 | A | * | 10/1999 | Yoshinaga | 235/375 |
| 6,002,844 | A | * | 12/1999 | Keshida et al. | 235/462 X |
| 6,042,279 | A | * | 3/2000 | Ackley | 235/462 X |
| 6,147,767 | A | * | 11/2000 | Petteruti et al. | 235/462 X |
| 6,189,781 | B1 | * | 2/2001 | Yoshinaga et al. | 235/375 |
| 6,216,227 | B1 | * | 4/2001 | Goldstein et al. | 705/65 |

FOREIGN PATENT DOCUMENTS

| | | | |
|---|---|---|---|
| JP | 0534238 | * | 12/1993 |
| JP | 06089355 | * | 3/1994 |

* cited by examiner

Primary Examiner—Karl D. Frech
Assistant Examiner—Allyson Sanders
(74) Attorney, Agent, or Firm—Abelman, Frayne & Schwab

(57) ABSTRACT

A system and a method for automatically analyzing and reading a barcode present in an electronically stored and transferred file, and/or printed on a printable substrate, such as a sheet of paper. Such a barcode can be used to store a large amount of information in a small area. Various uses of the disclosed system and method are possible, for example in order to authenticate and/or identify a document. In addition, such a barcode could be used to transmit information which could be automatically read and analyzed. This provides a single solution to the combined problems of data authentication and verification for electronically stored and transferred data, as well as of automatic reading and analysis of data printed on a printable substrate. Although the implementation in which the data is printed onto paper or other physical substrate material is particularly preferred, the overall flexibility of the disclosed system and method enable them to be employed in a variety of embodiments.

13 Claims, 2 Drawing Sheets

AUTOMATIC BARCODE CREATION FOR DATA TRANSFER AND RETRIEVAL

FIELD AND BACKGROUND OF THE INVENTION

The present invention relates to a system and a method for automatically printed a barcode on paper or other printer substrate, and in particular, to such a printed barcode for data transfer and/or capture.

Although a significant amount of data is transferred electronically, the requirement for paper still exists. Businesses today receive and send data of many different types on paper, including invoices, receipts, purchase requests, forms of various kinds, reports and so forth. The paper itself may be transferred by mail or by facsimile, for example. When transferred by facsimile, the quality of the resultant text and/or graphics may be degraded. Furthermore, the facsimile machine and/or printer may not place the text or graphics in exactly the same location on the paper every time. All of these factors combine to render the automatic reading and analysis of data from printed paper very difficult and frequently inaccurate. For example, OCR (optical character recognition) of a scanned sheet of paper requires good quality reproduction of the textual data in order to obtain an accurate analysis of the printed text. Such high quality is often difficult to obtain from a facsimile, for example. Thus, a human worker often must read each sheet of printed paper and transfer the data manually to a computer, which is highly inefficient.

However, paper does have certain advantages over completely electronic forms of data transfer. Even though attempts have been made to provide an electronic "signature" or "watermark", or other form of verification for electronically stored and transferred data, none of these attempts has resulted in such a verification which is as accurate and as reliable as the manually written signature of a human being on a sheet of paper. Thus, electronically transferred data may be easier to automatically read and analyze, without the intervention of a human worker, but suffers from the inability to guarantee the authenticity of the data.

A more useful solution would both enable data to be accurately and automatically read and analyzed from a sheet of printed paper, without the intervention of a human worker, and would also provide a mechanism for guaranteeing the authenticity of data which is stored and transferred electronically without being printed onto paper or other printable substrate. Currently, neither problem is adequately solved by the background art, and certainly the combination of both problems is not solved by a single background art solution.

There is thus a need for, and it would be useful to have, a system and a method for enabling data to be automatically read and analyzed from a printed sheet of paper or other printable substrate, even if the quality of the data is degraded by poor reproduction such as by a facsimile machine, for example, and which would also be suitable for guaranteeing the authenticity of electronically stored and transferred data.

SUMMARY OF THE INVENTION

The present invention is of a system and a method for automatically analyzing and reading a barcode present in an electronically stored and transferred file, and/or printed on a printable substrate, such as a sheet of paper. Such a barcode can be used to store a large amount of information in a small area. Various uses of the system and method of the present invention are possible, for example in order to authenticate and/or identify a document. In addition, such a barcode could be used to transmit information which could be automatically read and analyzed.

The present invention provides a single solution to the combined problems of data authentication and verification for electronically stored and transferred data, as well as of automatic reading and analysis of data printed on a printable substrate. Although the implementation of the present invention in which the data is printed onto paper or other physical substrate material is particularly preferred, the overall flexibility of the present invention enables it to be employed in a variety of embodiments.

According to the present invention, there is provided a system for printing a barcode onto a printable substrate, the barcode featuring a pattern of a plurality of marks, the system comprising: (a) an output device for receiving a plurality of printing commands and for printing a printable substrate according to the plurality of printing commands; (b) a computational device for receiving data to be printed; and (c) a printer driver module for being operated by the computational device and for translating at least a portion of the data to be printed into the barcode, and for determining at least one command for printing the barcode onto the printable substrate to form a printed barcode, the printer driver module passing the at least one command to the output device.

According to another embodiment of the present invention, there is provided a method for printing a barcode onto a printable substrate, the method comprising the steps of: (a) receiving data; (b) translating at least a portion of the data into a pattern of a plurality of marks; (c) determining at least one printing command for printing the pattern of the plurality marks; and (d) printing the pattern of the plurality of marks onto the printable substrate to form the barcode.

Hereinafter, the term "printable substrate" refers to any type of material onto which text and/or graphics can be printed, for example by a laser printer or an ink jet printer. Examples of such a substrate include but are not limited to a sheet of paper, cardboard or other wood pulp-based product, plastic and metal.

Hereinafter, the term "network" refers to a connection between any two computers which permits the transmission of data, and includes but is not limited to, the Internet, a WAN (Wide Area Network) and a LAN (Local Area Network).

Hereinafter, the term "computer" includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system; as well as a terminal or any computational device containing a microprocessor. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (USA).

The method of the present invention could also be described as a plurality of instructions being performed by a data processor, such that the method of the present invention could be implemented as hardware, software, firmware or a combination thereof. For the present invention, a software application could be written in substantially any suitable programming language, which could easily be selected by one of ordinary skill in the art. The programming language chosen should be compatible with the computer by which the software application is executed. Examples of suitable programming languages include, but are not limited to, C, C++ and Java.

BRIEF DESCRIPTION OF THE DRAWINGS

The foregoing and other objects, aspects and advantages will be better understood from the following detailed description of a preferred embodiment of the invention with reference to the drawings, wherein.

DETAILED DESCRIPTION OF THE INVENTION

The present invention is of a system and a method for automatically analyzing and reading a barcode present in an electronically stored and transferred file, and/or printed on a printable substrate, such as a sheet of paper. Such a barcode can be used to store a large amount of information in a small area. Various uses of the system and method of the present invention are possible, for example in order to authenticate and/or identify a document. In addition, such a barcode could be used to transmit information which could be automatically read and analyzed.

The present invention provides a single solution to the combined problems of data authentication and verification for electronically stored and transferred data, as well as of automatic reading and analysis of data printed on a printable substrate. Although the implementation of the present invention in which the data is printed onto paper or other physical substrate material is particularly preferred, the overall flexibility of the present invention enables it to be employed in a variety of embodiments.

The principles and operation of a system and method according to the present invention may be better understood with reference to the drawings and the accompanying description, it being understood that these drawings are given for illustrative purposes only and are not meant to be limiting.

Figure 1:
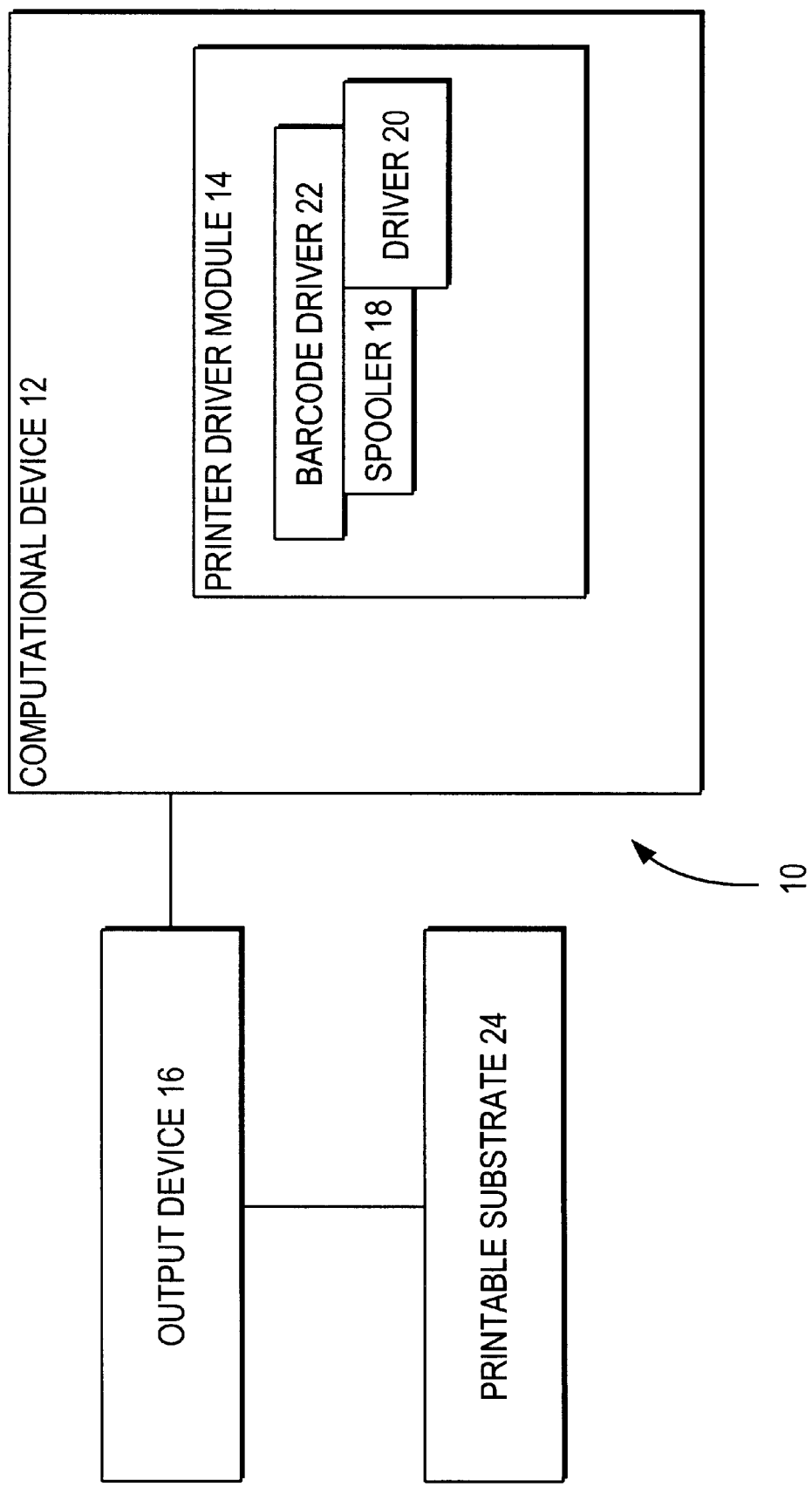
FIG. 1 is a schematic block diagram of an illustrative barcode printing system according to the present invention.

Referring now to the drawings, FIG. 1 is an exemplary block diagram of an illustrative system according to the present invention. A system 10 features a computational device 12 for operating software programs. Computational device 12 is typically a computer as defined above. Optionally and preferably, computational device 12 is any type of electronic device with an embedded operating system and a microprocessor, for example. For the purposes of description only and without intending to be limiting in any way, computational device 12 is assumed to be a computer.

Computational device 12 operates a printer driver software module 14 for enabling received data to be printed to an output device 16. Printer driver software module 14 is able to receive data and to manipulate this data into a format which can be printed to output device 16. Printer driver software module 14 includes a spooler 18 and a driver 20, as is known in the background art. The received data contains a number of commands which instruct printer driver software module 14 for printing the data. Driver 20 translates these commands for spooler 18, which in turn communicates with output device 16 for printing the data. The implementation of spooler 18 and driver 20 are both well known in the art and could easily be performed by one of ordinary skill in the art.

Printer driver software module 14 also features an additional module, which is a barcode driver 22 and which is not known in the background art. Barcode driver 22 examines the received data to be printed, and adds commands which are translatable by driver 20, such that spooler 18 also instructs output device 16 to print a barcode in addition to the received data, or alternatively and preferably in place of the received data.

As used herein, the term "barcode" refers to a two or three dimensional printed barcode, in which the third dimension is color, as disclosed for example in U.S. Pat. No. 5,304,786, incorporated by reference as if fully set forth herein. The disclosed two dimensional barcode features a plurality of symbols, which are determined according to a code and hence which can be decoded in order to obtain the information contained within the barcode. Such a barcode has a high capacity for information storage in a relatively small area. The barcode of U.S. Pat. No. 5,304,786 is able to store 1 kilobyte of memory in an area of a few square inches of printed substrate material. Thus, a large amount of information can be stored in place of, or in addition to, the initial received data.

The barcode of U.S. Pat. No. 5,304,786 is one example of such a barcode for use with the present invention, although other such barcodes could also be used. This barcode has a structure for containing the groups of symbols, or "codewords". Each codeword is a pattern of a plurality of elements or marks, which can be of varying height or of a relatively uniform low height. Each mark pattern must conform to certain rules, such that the codeword belongs to a particular family or set of mark patterns. The codewords are arranged in rows, such that neighboring rows contain codewords from different sets of mark patterns. Therefore, if a row crosses another row, which could prove detrimental to the decoding of the row of codewords, such a cross can be quickly detected. Furthermore, scanning the barcode is more easily performed, which is particularly useful for the present invention, which contemplates scanning of such barcodes with little or no manual intervention by a human operator.

Other examples of barcode technologies which are useful with the present invention include, but are not limited to, those disclosed in U.S. Pat. Nos. 5,313,564 and 5,801,848, both of which are incorporated by reference as if fully set forth herein.

Since a barcode is a pattern of symbols, barcode driver 22 must translate the received data into such symbols in order to determine the commands to be given to driver 22. For example, barcode driver 22 could first separate the received data into text and graphics, by separating commands concerning the fonts, the position of the text and the text itself from the other commands, such as page printer commands, for the graphics themselves and for position of the graphics. Data obtained from these other commands, such as for the graphics, are optionally included in the barcode.

Next, the text could be parsed into a plurality of words, while the graphics, if included, could be separated into separate graphical items, determined for example according to the boundary between text and each graphical item. At least of a portion of the words of the text could then be translated into a codeword or codewords. For example, if the received data pertains to an invoice, at least the important information, such as the name of the receiving company for example, is preferably translated into codewords. A description of the visual appearance of each graphical item could also optionally be translated into codewords.

Optionally and preferably, if the received data contains a printer command concerning a "remark" which is not to be printed, barcode driver 22 could retrieve the field name from the "remark" and could use this information to identify the following printed field. The field name could then be used by the scanning module (see FIG. 2 below) to identify the type of field, rather than relying only on position on the sheet of paper or other characteristics. Also optionally and preferably, barcode driver 22 would include specific user information in the barcode, such as the identity of the user, a password for the user and more preferably the date of printing, or other user information.

Barcode driver 22 could then determine the necessary command or commands for instructing spooler 18 to print these codewords through output device 16. For example, barcode driver 22 could determine where on the page the barcode is to be printed, and how portions of the barcode which do not fit on one page should be treated. For example, barcode driver 22 could optionally cause the barcode to be printed over a plurality of pages, if necessary.

Output device 16 is optionally and preferably a printer, such as a laser printer, a thermal printer or an inkjet printer for example, or even a facsimile machine, which prints the information to a printable substrate 24. In this context, printable substrate 24 is a material to which the printer is capable of applying ink, dye or other marking substance, or otherwise causing markings to appear on the material, in order to produce the barcode for describing the received information, such as paper, metal or plastic for example. Alternatively and preferably, output device 16 is an electronic storage medium, such as a magnetic or optical storage medium. In this context, printable substrate 24 is actually an electronic file which contains all of the description of the commands and instructions for printing the barcode alone, or barcode with the received data, to a substrate such as paper for example. This file could then optionally be read directly by spooler 18 for printing on the same type of printer as the printer command language which was originally used, although the file could be also optionally be converted to another printer command language for printing on a different type of printer. The file could also be translated to a file type which is readable by other software programs, such as by word processing programs for example, particularly if the file is an EMF file. Both types of "printing" to printable substrate 24, whether to a substrate such as paper or to an electronic file, are contemplated within the present invention.

One illustrative example of a method for printing the barcode, either alone or with the received data, is a method for directing a laser printer to print the information to paper by a computer operating according to a version of the Windows™ operating system (Microsoft Ltd.), such as Windows 95™, Windows 98™ or NT 4 for example. A printer driver software module in one of these operating systems is typically able to perform either raw printing or EMF printing. EMF (extended metafile) printing involves determining the appropriate GDI (graphics device interface) commands for printing the information. These GDI commands are then stored in an EMF file. The spooler then reads this spool file, and translates the GDI commands into raw print commands by using the printer driver. Thus, if all of these commands are copied into an electronic file, the resultant file could be used to print the barcode or other information.

Therefore, in this example the printer driver software module of the present invention, and more particularly the barcode driver, preferably translates at least a portion of the received data into the GDI commands for being printed as the barcode. These GDI commands would be used in this example to determine the visual appearance of the codewords, such that the resultant barcode would have the correct pattern when printed on a sheet of paper for example. In addition, the EMF file could be inserted into another electronic file, such as a word processing file for example, in order to provide identification and authentication through a watermark for example.

Other examples of printing command languages which are suitable for use with the present invention include but are not limited to PostScript™ (Adobe Research Ltd.), PCL™ (Hewlett Packard Ltd.), CAPSL™ (Canon Ltd.), PPL™ (Digital Ltd.), all versions of these languages, as well as other printer command languages.

Figure 2:
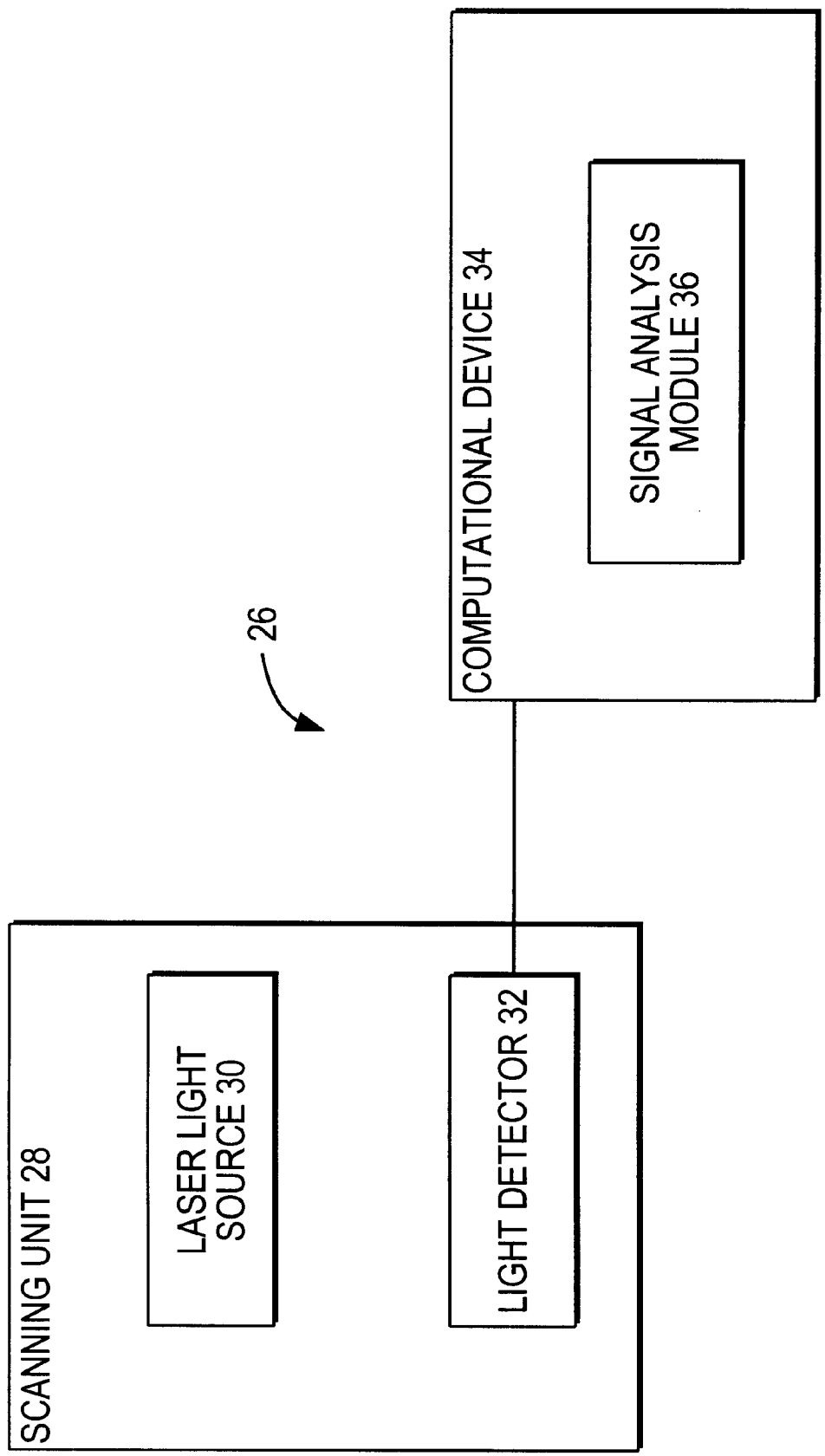
FIG. 2 is a schematic block diagram of an illustrative barcode scanning system according to the present invention.

FIG. 2 shows a scanning system 26 for automatically reading and analyzing the barcode when printed onto a printable substrate such as a sheet of paper, for example. Scanning system 26 includes a scanning unit 28 for detecting the barcode on the printable substrate. Scanning unit 28 optionally and preferably features a laser light source 30 for generating a laser beam which is directed toward the printable substrate containing the barcode. Reflected light is then received by a light detector 32. Signals from light detector 32 are passed to a computational device 34, which may be similar to the computational device of FIG. 1.

Other possible embodiments for scanning unit 28 include but are not limited to a flatbed scanner or other types of scanning devices, and a CCD (charge-coupled device) cameras, or video capturing systems.

Computational device 34 operates a signal analysis module 36, which analyzes the received signals from the reflected light in order to obtain the information from the barcode. If the barcode is as disclosed in U.S. Pat. No. 5,304,786, then the method for analysis and decoding which is disclosed therein is optionally used in signal analysis module 36. According to U.S. Pat. No. 5,304,786, the barcode is preferably decoded in a two step process. In the first step, the set of the codeword is determined according to a discriminator function. In the second step, the symbolic meaning assigned to the codeword is determined from a mathematical function, for example from a look-up table. Error detecting and correcting functions are optionally performed. Thus, the content of the information encoded by the barcode is preferably determined according to a process which is able to handle degraded or imperfectly transmitted barcode data.

Such an ability is particularly important for a number of different preferred embodiments of the present invention. For example, the system and method of the present invention could be used for transmitting information by facsimile. Such transmission is frequently imperfect and/or produces received data of degraded quality. Thus, the method and system of the present invention are preferably implemented with a barcode which is resistant to degradation of quality during transmission.

In addition, the system and method of the present invention are useful for the identification of the sender or author of a document, and/or for authentication of the document source. For example, the system and method of the present invention can be used to add a "watermark" to a printed document, which would indicate the identity of the person who should receive it. Such a "watermark" could also contain a password for an electronically stored and/or transmitted file, which would be required in order for the information to be retrieved from the file, for example.

Other possible embodiments of the system and method of the present invention include for a device which would read data in an audible, electronically generated voice, for example for those individuals who have limited vision.

The location of the barcode on a sheet of paper can be adjusted as desired, particularly for the security and authentication embodiments described previously. For example, the barcode could be divided into a plurality of portions, with each portion appearing on one of a plurality of sheets of paper, thereby authenticating multiple pages of a document if not the entirety of the document. Alternatively, the entire barcode could be printed on one sheet of paper, and could be compared to the text and other information contained on that sheet for the purposes of authentication.

According to other preferred embodiments of the present invention, the functional modules described in FIGS. 1 and 2 can be implemented as hardware, firmware or a combination thereof, in addition to the described implementation as software modules. For example, the printer driver software module of FIG. 1 is optionally implemented as a hardware device. Such a hardware device could be attached to the serial or parallel printer port, or other data ports such as a USB port, infrared port, GPAB port or SCSI port, or even a network card, such that data flowing from the computer to the printer would be intercepted by the printer driver hardware device. This hardware device would then add the barcode data, or optionally replace the data to be printed with the barcode data, such that at least the barcode data would be printed by the printer. Alternatively, the printer driver hardware device could be implemented as a card, a SIMM or a DIMM, which would be connected to the bus on the printer. Also alternatively, the printer driver hardware device could be implemented as a chip which could be added to the printer itself and/or to the computer. If implemented as software, the software could be added to the system of the printer. In addition, the scanning module software could be added to the scanner system for operation by the scanner. Thus, the present invention can be implemented according to a number of different embodiments.

It will be appreciated that the above descriptions are intended only to serve as examples, and that many other embodiments are possible within the spirit and the scope of the present invention.

What is claimed is:

1. A system for automatically printing an at least two-dimensional barcode onto a printable substrate, the barcode featuring a pattern of a plurality of marks, the system comprising:
   (a) an output device for receiving a plurality of printing commands and for printing a printable substrate according to said plurality of printing commands;
   (b) a computational device for receiving data to be printed; and
   (c) a printer driver module for being operated by said computational device and for automatically translating into the at least two-dimensional barcode at least a portion of said data including at least one selected from a group including: substantially all text along with information regarding a visual appearance of said substantially all text and substantially all graphical images along with information regarding a visual appearance of said substantially all graphical images, and for automatically determining at least one command for printing the barcode onto said printable substrate to form a printed barcode, said printer driver module passing said at least one command to said output device so that said output device is enabled to print the barcode in addition to said data to be printed.

2. The system of claim 1, wherein said printer driver module further comprises:
   (i) a barcode driver for receiving said data to be printed, for analyzing said data and for translating at least a portion of said data into the pattern of the plurality of marks for determining the barcode;
   (ii) a driver for receiving at least the pattern of the plurality of marks and for determining a plurality of printer commands for printing the pattern of the plurality of marks; and
   (iii) a spooler for receiving said plurality of printer commands and for translating said plurality of printer commands into instructions for said output device for printing.

3. The system of claim 2, wherein said output device is a printer for printing onto a material selected from the group consisting of paper, metal and plastic.

4. The system of claim 3, wherein said printer device module is implemented as a hardware device for connecting said computational device to said output device.

5. The system of claim 3, wherein said printer driver module is implemented as a hardware device for connecting only to said computational device.

6. The system of claim 3, wherein said printer device module is implemented as a software module.

7. The system of claim 1, further comprising:
   (d) a scanning system for reading said printed barcode and for retrieving said at least a portion of said data to be printed from said printed barcode.

8. The system of claim 7, wherein said scanning system further comprises:
   (i) a laser light source for reflecting a laser beam onto said printed barcode;
   (ii) a light detector for detecting reflected light from said printed barcode; and
   (iii) a signal analysis module for being operated by said computational device and for determining said at least a portion of said data to be printed from said printed barcode.

9. A method for printing an at least two-dimensional barcode onto a printable substrate, the method comprising the steps of:
   (a) receiving data;
   (b) translating at least a portion of said data including at least one selected from a group including: substantially all text along with information regarding a visual appearance of said substantially all text and substantially all graphical images along with information regarding a visual appearance of said substantially all graphical images into a pattern of a plurality of marks corresponding to the at least two-dimensiaonal barcode;
   (c) determining at least one printing command for printing said pattern of said plurality of marks; and
   (d) in addition to printing said data, printing said pattern of said plurality of marks onto the printable substrate to form the at least two-dimensional barcode.

10. The method of claim 9, wherein said data features text, such that step (b) comprises the steps of:
  (i) dividing said text into a plurality of words; and
  (ii) translating each word into a word pattern of a plurality of marks.

11. The method of claim 10, wherein said data further features at least one graphical image, a boundary of said at least one graphical image being determined according to said plurality of words, and step (b) further comprises the step of:
  (iii) translating said at least one graphical image into a pattern of a plurality of marks.

12. The method of claim 11, wherein said printable substrate is selected from the group consisting of paper, metal and plastic, and step (d) is performed by printing a visible marking substance to said printable substrate.

13. The method of claim 12, wherein said printable substrate is a document and the barcode contains information for authenticating a source of said document.

* * * * *

UNITED STATES PATENT AND TRADEMARK OFFICE
CERTIFICATE OF CORRECTION

PATENT NO. : 6,484,933 B1
DATED : November 26, 2003
INVENTOR(S) : Israel Zimmerman et al.

It is certified that error appears in the above-identified patent and that said Letters Patent is hereby corrected as shown below:

<u>Title page,</u>
Item [73], Assignee, replace "L.C. Code Ltd" with -- I.C. Code Ltd. --

<u>Column 8,</u>
Line 9, replace "wherein said printer device module" with -- wherein said printer driver module --.
Line 26, replace "wherein said printer device module" with -- wherein said printer driver module --.

Signed and Sealed this

Sixteenth Day of December, 2003

JAMES E. ROGAN
*Director of the United States Patent and Trademark Office*